Patented Nov. 23, 1937

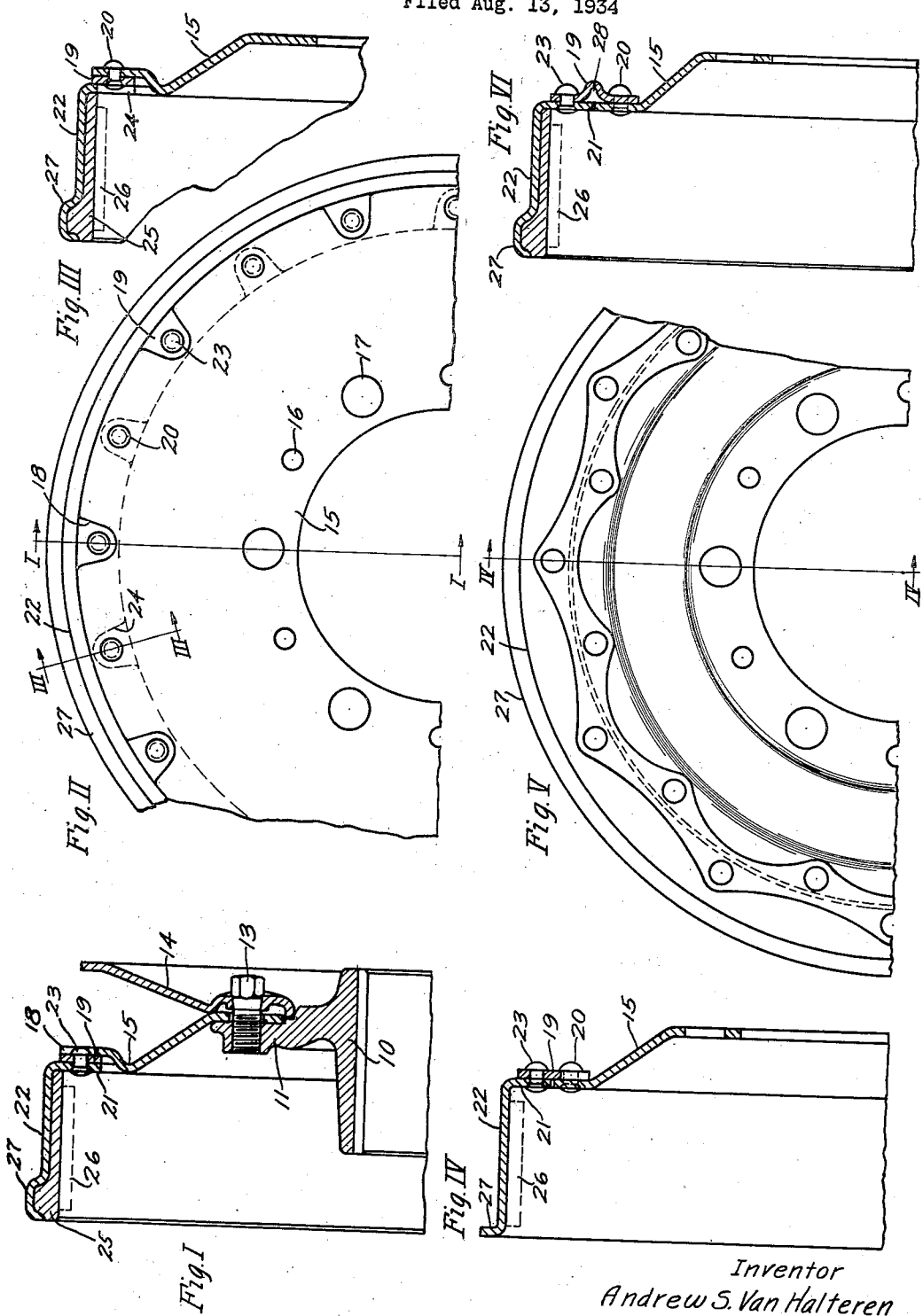

2,099,833

UNITED STATES PATENT OFFICE 2,099,833

BRAKE DRUM CONSTRUCTION

Andrew S. Van Halteren, Akron, Ohio, assignor to Motor Wheel Corporation, Lansing, Mich., a corporation of Michigan Application August 13, 1934, Serial No. 739,627

10 Claims. (Cl. 188—218)

The present invention relates to wheel constructions, and has particular reference to improvements in the construction of wheel structures of the type having a braking system.

Wheel constructions such as are commonly used in connection with automobiles, trucks and buses customarily are provided with rotative braking elements which cooperate with complementary braking elements carried by the axle to which the wheel is attached. This braking system ordinarily is of the internal expansion type in which the non-rotative elements attached to the axle or body of the vehicle expand outwardly upon application of an operating pedal to frictionally engage a rotative braking surface carried by the wheel. The heat generated by this frictional engagement causes an objectionable distortion of the metallic elements of the wheel construction, and a principal object of the present invention is the provision of a wheel construction having compensating means operative to reduce this objectionable distortion.

An additional object is to provide a wheel construction having a particularly effective braking structure.

A further object is the provision of a wheel construction which will permit of a more even application of the braking system when the temperature thereof has been raised as by the heat generated by frequent application of the brakes.

These and other objects will be apparent from a consideration of the following illustrative and explanative description and by reference to the accompanying drawing, in which Fig. 1 is a fragmentary section of a wheel construction made in accordance with my invention and taken along line 1—1 of Fig. 2;

Fig. 2 is a front view of the wheel construction shown in Fig. 1 with the hub member removed;

Fig. 3 is a sectional view of the wheel construction shown in Fig. 2 taken along line 3—3 of the latter;

Fig. 4 is a sectional view of the modified wheel construction shown in Fig. 5 and is taken along line 4—4 thereof;

Fig. 5 is a front view of a modified wheel construction made in accordance with my invention; and Fig. 6 is a sectional view similar to Fig. 5 showing a still further modification of my improved wheel construction.

As shown in Fig. 1 the wheel construction includes a hub member 10 which is rotatively mounted about an axle (not shown) of a vehicle. The hub member has an annular flange or mounting portion 11. This flange has a number of threaded openings which receive the lugs or wheel bolts 13 for demountably securing a disk 14 or other suitable felly-supporting member to the hub member. It will be understood that the member 14 constitutes a support for the tire of the wheel construction, and since the structure of the member 14 and its outer tire-carrying felly or rim (not shown) may be of conventional design a further description thereof is unnecessary.

Between disk 14 and flange 11 of the hub member is attached an outwardly extending back portion 15 of a brake drum, the attachment being made by rivets extending through the openings 16 of the drum back portion shown in Fig. 2 and through similar openings in the flange 11. Openings 17 are provided in the drum back portion for receipt of lugs 13.

Adjacent its periphery, drum back portion 15 is provided with a plurality of cut-away portions 18 to be seen in Figs. 1 and 2, and approximately midway between these cut-away portions suitable rivet holes are bored. An annular ring 19 of a metal such as copper having a high coefficient of expansion is secured to the drum back portion by means of rivets 20 extending through rivet holes provided therein.

The copper ring 19 also is secured to a downwardly extending flange 21 of a brake drum ring 22 by means of rivets 23 which are alternately positioned with respect to rivets 20. Flange 21 has a series of cut-away portions 24, to be observed in Fig. 3 and in dotted lines in Fig. 2, for receipt of the heads of rivets 20. Cut-away portions 18 in the drum back portion 15 likewise receive the heads of rivets 23 by which copper strip 19 is attached to the brake drum ring 22.

In this construction the copper member 19 forms a connection between the two elements of the brake drum, namely, the drum ring and the drum back. The drum ring is attached to the copper strip as is the drum back, but there is no direct connection between the drum ring and drum back.

Drum ring 22 is composed of a substantially horizontally extending tubular portion having a free edge or end spaced some distance from the outer or attached edge which is secured to band 19.

On its under side the ring 22 is provided with a braking surface which as shown in the drawing is composed of a cast metal liner 25. The inner surface of the ring 22 may constitute the braking surface without the addition of a separate lining.

The non-rotating portion of the braking system may be of conventional design and it is sufficient to illustrate the structure by reference to the brake band 26 shown in dotted lines in the drawing. Upon application of the control pedal of the braking system, the band 26 expands into frictional engagement with the revolving braking surface provided by ring 22, thereby causing the rotation of the wheel construction to diminish. The heat generated by this frictional engagement is so substantial that the temperature of ring 22 may be raised to as much as several hundred degrees Fahrenheit. This elevated temperature causes the ring 22 to expand a considerable amount. The inner or unattached edge of ring 22 is free to expand, but the outer edge of the ring ordinarily is secured to the drum back portion, so that the ring tends to be distorted upwardly about its attached edge as a pivot. When such a condition is present, the free edge of the braking surface has a greater diameter than the attached edge, thereby causing the brake band 26 to contact the braking surface along a reduced area. The efficiency of the braking system is thereby impaired and an undue amount of wear is occasioned on one portion of the brake band. The action described is responsible to a considerable extent for the common experience of brakes operating satisfactorily when the automobile first starts but operating inadequately upon continued driving. Customarily, ring 22 is provided with an enlarged or flanged portion 27 adjacent its free edge to reduce the outward expansion, but this structure is not sufficient to maintain a parallel relation between the braking surface and the brake band.

In a wheel construction having the structure specified herein, the heat of the drum ring 22 is imparted in part to the highly expansible ring 19. This ring expands outwardly as its temperature increases, thereby tending to destroy the pivotal expansion of ring 22 and maintaining the braking surface of the latter in substantially its normal shape. That is, as the band 19 expands outwardly the braking surface of ring 22 tends more nearly to remain parallel to the surface of brake band 26. Since drum ring 22 is not directly attached to drum back 15, the former is free to expand outwardly to the full extent of the expansibility of the compensating member 19.

In the embodiment shown in Figs. 4 and 5, ring 22 is not provided with a separate liner. Also, the ring 22 is secured in adjacent rather than overlapped relation with respect to the drum back portion. Expansion compensating member 19 is in the form of a ring having oppositely extending projecting portions alternately connected to the brake drum ring 22 and the brake drum back 15 by means of rivets 23 and 20 respectively. In cool position, ring 22 is substantially in abutment with the drum back, as shown in Fig. 4. When the structure becomes hot, band 19 expands outwardly to increase the space between the drum ring and the drum back, thereby compensating for the outer expansion of the free edge of the drum ring and maintaining the parallel relation between the braking surface of ring 22 and brake band 26.

As shown in Fig. 6, the expansion compensating member 19 may be further modified by providing therein a corrugation or expansion joint 28 which increases the possible outward expansion of member 19 and thereby provides for a more nearly parallel relation between the braking surface of ring 22 and brake band 26. This corrugation may be of any suitable shape to provide extra material for the band 19 between the points to which it is attached to the drum ring and to the drum back. This particular construction compensates for expansion due to mechanical distortion as well as heat distortion. That is to say, the expansion member 19 not only has a higher coefficient of expansion than the other parts of the drum but also is flexible radially in response to mechanical pressure in a radial direction.

Further changes in the structure described herein are possible without departing from the scope of my invention. For instance, the expansion compensating means may be differently shaped and of different metal than copper. Of course in any event the expansion member has a higher coefficient of expansion than the rest of the drum. All such variations are intended to be included in the appended claims.

I claim:

1. In a wheel construction, a rotatable hub member, a brake drum mounted on the hub member, said drum including a back portion and a ring portion, and an expansion member connected to the back portion and ring to join the two together, said expansion member having a higher coefficient of expansion than either the ring or back portion.

2. In a wheel construction, a rotatable hub member, a brake drum mounted on the hub member, said drum including a back portion and a ring portion, and an expansion member connected to the back portion and ring to join the two together, said expansion member being of greater flexibility and having a higher coefficient of expansion than either the ring or back portion.

3. A brake drum comprising a brake ring having an attaching flange, a drum back arranged with its periphery in abutting relation to the edge of said flange, and an expansion member having oppositely extending portions at its edges alternately connected to said flange and back.

4. A brake drum comprising a brake ring having an attaching flange, a drum back arranged with its periphery in overlapping relation to said flange, and an expansion member secured alternately to said flange and back at spaced intervals.

5. A brake drum comprising a brake ring, a drum back, and an expansion member connecting the ring and back to each other, the expansion member being of different material and of greater expansibility than either the ring or back.

6. A brake drum comprising a brake ring having a radial attaching flange, a drum back arranged in overlapping relation to said flange, and a separate expansion ring positioned between the flange and back and connected to each independently of the other at circumferentially spaced points.

7. A brake drum comprising a ring portion, a drum back for the ring portion, and an expansion member connected to the ring and back to join the two together, said expansion member having a higher coefficient of expansion than either the ring portion or back.

8. A brake drum comprising a ring portion, a drum back for the ring portion, and an expansion member connected to the ring portion and back to join the two together, said expansion member being of greater flexibility and having a higher coefficient of expansion than either the ring portion or back.

9. In a wheel construction including two separate radially extending annular portions arranged in radial alignment one of which is attached to a hub, means for attaching the two together comprising a ring having oppositely extending portions at its edges alternately secured to said annular portions.

10. In a wheel construction including two separate radially extending annular portions arranged in substantial radial alignment with one of the parts attached to a hub, means for attaching the two together comprising a separate attaching element having a higher coefficient of expansion than either of the two annular portions.

ANDREW S. VAN HALTEREN.